United States Patent [19]

Hardin, Jr. et al.

[11] Patent Number: 4,657,095

[45] Date of Patent: Apr. 14, 1987

[54] COMPACT ICE BASKET WEIGHING TOOL

[75] Inventors: Roy T. Hardin, Jr., Unity Township, Westmoreland County; Paul Pomaibo, N. Huntingdon; Charles M. Scrabis, Pittsburgh, all of Pa.

[73] Assignee: Westinghouse Electric Corp., Pittsburgh, Pa.

[21] Appl. No.: 785,380

[22] Filed: Oct. 8, 1985

[51] Int. Cl.$^4$ .................... G01G 19/52; G01G 19/14; G01G 5/04; B66F 3/24
[52] U.S. Cl. ................................. 177/132; 177/147; 177/208; 254/93 R
[58] Field of Search .............. 177/126, 132, 147, 208, 177/254; 254/93 R

[56] References Cited

U.S. PATENT DOCUMENTS

| 1,934,201 | 11/1933 | Miller | 177/147 X |
| 3,866,464 | 2/1975 | Franklin | 177/147 X |
| 3,910,365 | 10/1975 | Buchele | 177/208 X |
| 4,004,647 | 1/1977 | Forst et al. | 177/132 X |

Primary Examiner—George H. Miller, Jr.
Attorney, Agent, or Firm—Daniel C. Abeles

[57] ABSTRACT

A weighing tool and method for determining the weight of ice contained within each of a plurality of ice baskets received within corresponding compartments of a lattice frame, as employed with nuclear power generators. A cylinder body includes lug support frames and corresponding lugs movable to retracted positions for inserting the weighing tool within the upper end of an ice basket, and to extended positions for being engaging in the ice basket and securing the tool thereto. A piston movable in sliding relationship within the body and defining upper and lower compartment therein is secured through a piston rod to a support bar which rests on the lattice frame and spans the compartment. Hydraulic fluid under controlled, increasing pressure is introduced into the upper compartment, driving the cylinder body upwardly relatively to the stationary piston so as to raise the ice basket. The pressure necessary to lift the ice basket provides a measure of the total weight of the ice basket. Alternatively or additionally, a load cell subjected to the weight of the raised ice basket provides an output indication of the weight. Since the weight of the empty ice basket is known, a simple subtraction yields the weight of ice resident within the ice basket.

13 Claims, 3 Drawing Figures

COMPACT ICE BASKET WEIGHING TOOL

BACKGROUND OF THE INVENTION

1. Field of the Invention

This invention relates to a tool for weighing ice baskets, or ice condensers, as are employed as a safety element with certain types of nuclear reactors, and, more particularly, to a compact such ice basket weighing tool for use at the top of the ice basket, with minimal disturbance to the existing framework and supports, for lifting the basket and determining its weight.

2. State of the Prior Art

Ice baskets, or ice condensers, of the type with which the compact ice basket weighing tool of the invention is to be employed, are provided with various types of nuclear reactors for condensing the steam from the primary water of a reactor in the event of an accidental loss of coolant. In a typical installation, there are provided approximately two thousand ice baskets, each of which is approximately one foot in diameter and 48 feet in height, and initially is filled with approximately 1,500 pounds of ice. The sidewalls of the ice basket are substantially cylindrical in configuration and are perforated, to permit rapid exposure of the steam to the ice and thus achieve corresponding, rapid condensation. The ice baskets are of substantial size, typically some 48 feet in height and approximately one foot in diameter, and are closely spaced within existing framework and supports which greatly restrict access thereto. To be effective, the ice baskets must contain a sufficient volume and weight of ice, typically a minimum of 1,200 pounds of ice per basket, to achieve the required cooling effect. Due to sublimation of ice, however, the initial charge of ice within each basket is depleted over time.

It thus is necessary to determine the amount of ice actually resident within each of the baskets, and to do so with a minimum of disturbance to the existing framework and supports associated with the assemblage of ice baskets and preferably with a minimum possible amount of time and effort on the part of service personnel performing this task.

SUMMARY OF THE INVENTION

In accordance with the invention, there is provided both apparatus and a related method for determining the amount of ice in an ice containment structure, or ice basket, employed with nuclear power plants. Particularly, a weighing tool is provided which is ideally suited for being inserted within the upper end of the ice basket, despite the presence of confining structures limiting access thereto. Particularly, a lattice frame defines compartments in which respective ice baskets are received, the frame extending above the top ends of the ice baskets and providing lateral support therefore.

The weighing tool comprises a cylinder housing, or body, which receives a piston in sealed, sliding relationship therewithin, defining thereby upper and lower sealed chambers within the body, a piston rod being secured at its lower end to the piston and having an upper, free end extending above the body. Support frames extending laterally from the housing define channels therewithin for receiving moveable support lugs in sliding relationship, the lugs being moveable to a retracted position to facilitate positioning the tool within the upper, open end of the ice basket and an extended position in which the lugs are received through holes conventionally provided in the cylindrical sidewalls of the ice basket. Preferably, the lugs are received through holes in the cylindrical sidewall of the ice basket which are immediately adjacent a conventional support ring attached within the ice basket, the support ring being the load bearing element on which the lugs act in lifting the ice basket.

The tool, as initially inserted with the lugs disposed in the holes in the cylindrical sidewalls in their extended positions, then is held in position while a support bar having a central aperture therein is positioned on the lattice support frame so as to span the compartment surrounding the given ice basket, the upper free end of the piston rod being received through the central aperture in the support bar. The upper end of the piston rod preferably is threaded such that a nut may be manually screwed thereon to tightly engage the upper end of the piston rod with the support bar, thereby assuring that the piston is in abutting relationship with an upper end closure of the cylinder body and the lugs are engaging the support ring of the ice basket. Hydraulic fluid under pressure then is introduced into the upper chamber of the housing, driving the housing upwardly relatively to the stationary piston, and lifting the ice basket from its base. The pressure of the applied fluid, necessary to lift the ice basket, relative to the area of the piston, affords, through a known calculation, the weight of the ice basket. Additionally, or alternatively, a transducer may be interposed between the support bar and the nut which secures the upper end of the piston rod to the support bar, which provides an output indicating the weight of the ice basket, when raised. Since the weight of the empty ice basket is known, a simple subtraction calculation affords the weight of the ice contained therein.

DETAILED DESCRIPTION OF THE PREFERRED EMBODIMENTS

Figure 1:
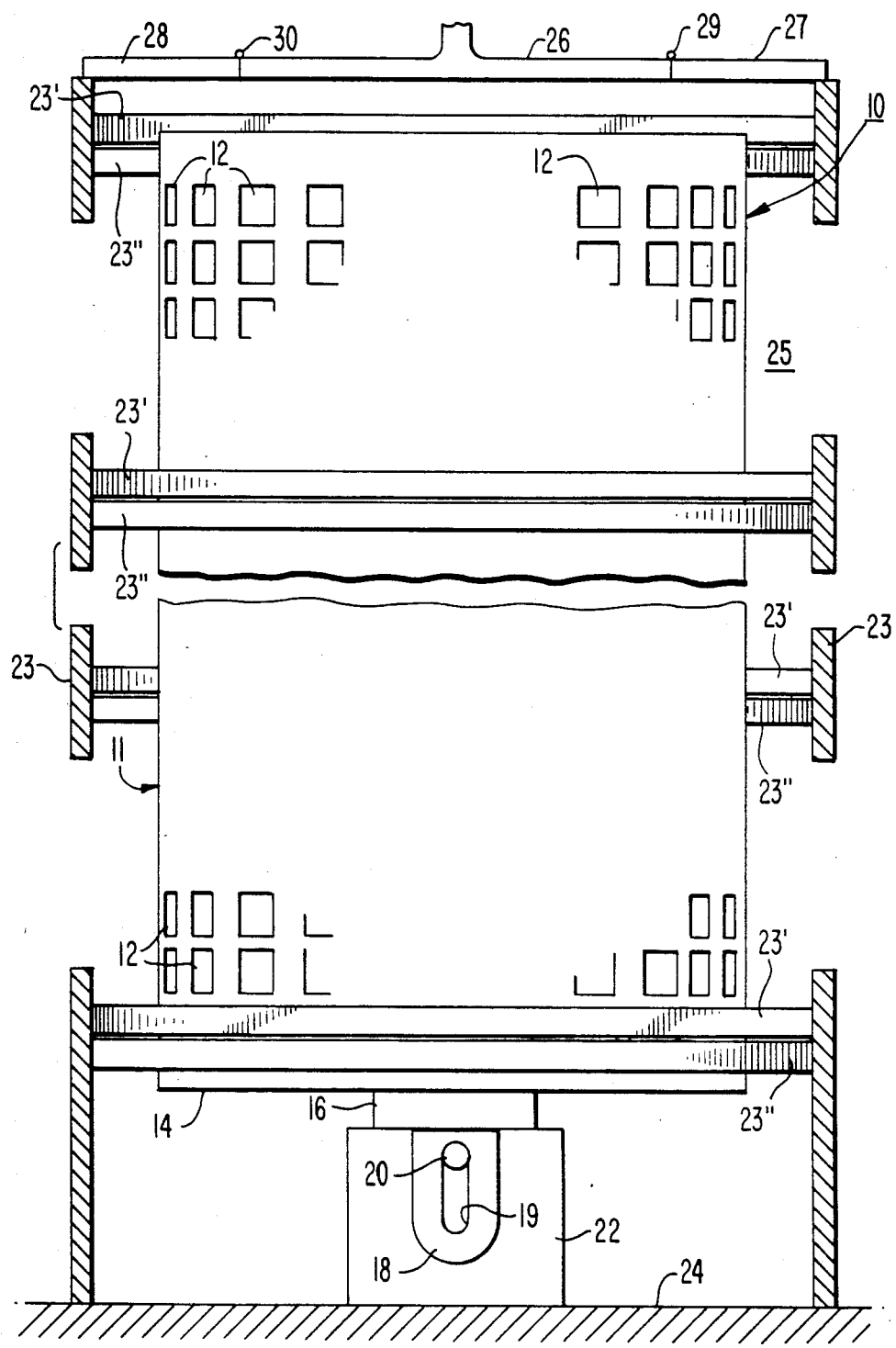
FIG. 1 is a simplified elevational view, partly in cross-section, of an ice basket, or ice condenser, illustrating its basic configuration and related supporting structure.

FIG. 1 is a simplified elevational view, partly in cross-section, of an ice basket 10, also termed an ice condenser, of the type with which the ice basket weighing tool of the present invention may be employed. The ice basket 10 is a generally cylindrical structure, approximately one foot in diameter and approximately 48 feet in height. The cylindrical sidewall 11 of the ice basket 10 includes a number of apertures 12 illustratively disposed in aligned rows and columns about the circumference of the cylindrical sidewall 11. Typically, the ice basket 10 is open at its upper end and is closed by a circular metal wire mesh plate 14 at its lower end. A mounting plate 16 is secured to the bottom of the basket 10, to which is affixed a pair of depending brackets 18

(only one of which is shown in FIG. 1). Each bracket 18 includes an elongated slot 19 through which a restraining pin 20 is received, the latter being secured within a vertical frame element 22 which is rigidly mounted on an underlying support 24. A series of lattice frames 23, typically seven in number and spaced at six foot vertical intervals, defines a compartment 25 which surrounds and confines the corresponding ice basket 10, closely spaced from the sidewall 11 thereof. The lattice frame 23 may take any of various forms, its principal purpose being to provide lateral support for the ice basket 10, given its somewhat loose and pivotal mounting as above described. Thus, the lattice frame 23 is shown to include horizontal straps 23' and 23" which extend in criss-cross fashion at each interval or level (i.e., straps 23' and 23" would cross in X-shaped relationship) so as to engage the exterior side walls of the basket 10 and maintain same in a generally vertical orientation. Thus, the lattice frame 23 defines a vertically extending grid of plural independent compartments for receiving respectively corresponding ice baskets 10 in closely spaced relationship therewithin. Thus, it will be understood that additional ice baskets 10 (not shown) would be disposed on the opposite sides of the sections of the lattice frame 23 illustrated in FIG. 2. In some installations, there additionally exists an overhead structure disposed closely above the top of the ice basket 10 and which may comprise a central support frame 26 which spans across and above the ice baskets 10 and cover plates or access doors 27 and 28 which are connected to the frame 26 by hinges 29 and 30, respectively. Although illustrated in a simplified manner in FIG. 1, the support frame 26 may comprise plural I-beams extending in generally parallel relationship, successive pairs of hinged access doors being supported at their hinged connections on corresponding, alternate ones of the I-beams and at the respective free ends thereof on the corresponding, adjacent I-beams, in a repeating pattern, so as to cover all of the ice baskets 10. As will be understood, the hinged access doors 27 and 28 may be tilted upwardly and/or removed, as is appropriate, to gain access to the top of the ice basket 10.

Figure 2:
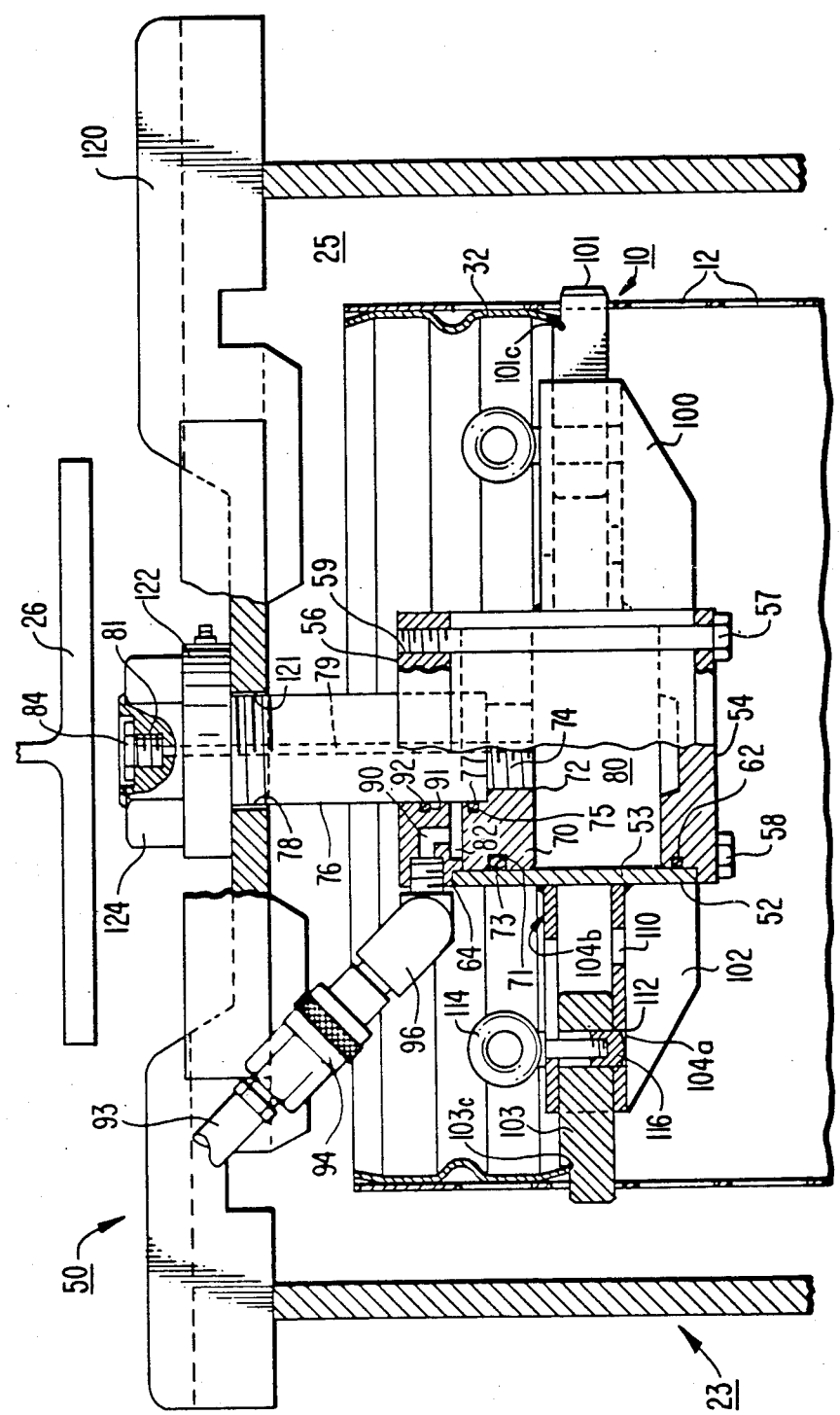
FIG. 2 is a cross-sectional view, partly in cross-section, of the compact ice basket weighing tool of the present invention, as assembled within the top portion of an ice basket in preparation for a weighing operation.

The elevational view of FIG. 2, shown partly in cross-section, illustrates the ice basket weighing tool 50 of the invention as received within an ice basket 10 from the open, upper end thereof, positioned to initiate a weighing operation. As will now be explained, the design of the weighing tool 50 of the invention takes into account the restricted access limitations imposed by the overhead structure 26, and is specially adapted for cooperation with the configuration of the typical ice basket 10. Particularly, on the interior of the cylindrical walls 11 of the ice basket 10, there are provided a plurality of support rings 32 at vertically displaced locations throughout the ice basket 10 (only one of which is shown in FIG. 2). Each ring 32 has a rib-like cross-section and is secured to the cylindrical sidewall 11 of the ice basket 10 by screws or other suitable techniques. FIG. 2 as well illustrates the overhead structure 26, the hinged cover plates 27 and 28 being removed for ease of illustration.

From FIG. 2, it will be appreciated that where an overhead structure 26 is present, only very limited access space is available for reaching the interior of the ice basket 10. The ice basket weighing tool 50 thus must be capable of being inserted through the limited opening between the overhead structure 26 and the lattice frame 23 for insertion into the interior of the ice basket 10. This imposes the requirement that the tool 50 be relatively compact in size while also being of sufficient structural integrity for performing its required function of weighing the ice basket 10 and that it be easily operable for this purpose. As will be appreciated from the following description, the ice basket weighing tool 50 of the invention is of a highly effective design which meets and satisfies these stringent requirements.

Figure 3:
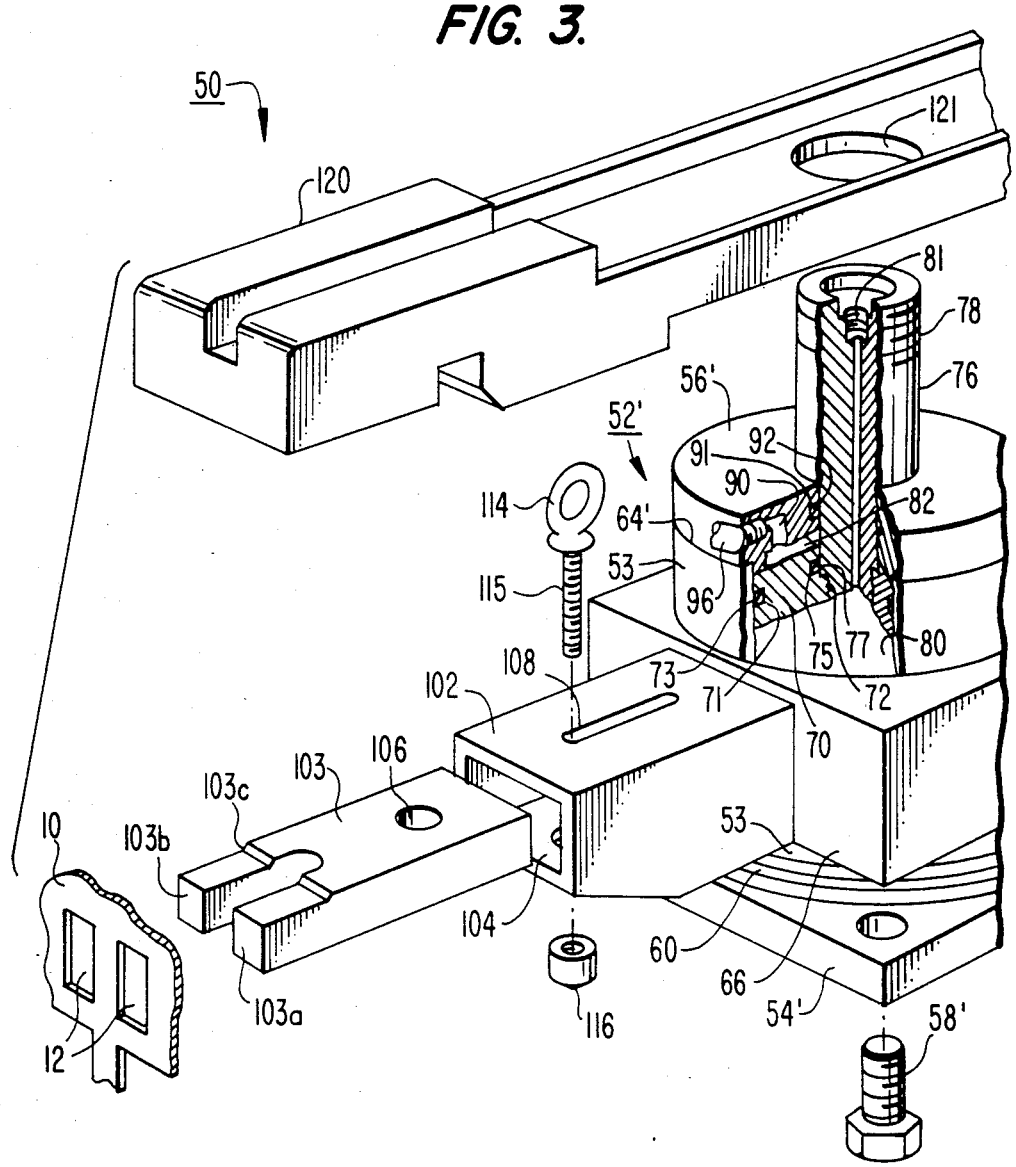
FIG. 3 is an elevational view, partly exploded and partly in cross-section, of portions of the ice basket weighing tool in accordance with the present invention, as illustrated in FIG. 2, for purposes of clarification.

With concurrent reference to FIG. 2 and the exploded, perspective view of FIG. 3, the compact ice basket weighing tool 50 of the invention comprises a cylinder body 52 having a cylindrical sidewall 53, a bottom enclosure 54 and a top enclosure 56. In the configuration shown in FIG. 2, each of the bottom enclosure 54 and the top enclosure 56 may be of generally square configuration such that bolts, as shown at 57 and 58, may be received through suitable holes (not shown) in the corners of the bottom enclosure 54 and engage corresponding, threaded holes (not shown) in the corresponding corners of the top enclosure 56, as shown at 59. Each of the enclosures 54 and 56 is machined to define a circular ledge thereabout for receiving the corresponding ends of the cylindrical sidewall 53, O-ring 62 sealing the lower end thereof to the bottom enclosure 54 and weld bead 64 joining the top end thereof to the top enclosure 56. The perspective, exploded view of FIG. 3 illustrates an alternative but functionally equivalent structure in which the bottom enclosure 54' includes an annular groove 60 in its upper surface for receiving the lower end of the cylindrical sidewall 53 of the body 52', the assembled elements conveniently being secured and sealed together by welding. A generally square mounting block 66 having a central aperture therethrough is received over and welded to the cylindrical sidewall 53' and is machined to include threaded holes (not shown) in each corner for receiving a corresponding bolt 58' for securing the bottom plate 54' thereto. In this embodiment, the top enclsoure 56' is of circular configuration and is secured to the cylindrical sidewall 53' by a weld bead 64'.

In both of the equivalent embodiments of FIGS. 2 and 3, a piston 70 includes a central threaded aperture 72 for receiving the threaded lower end 74 of a piston rod 76, the latter having an upper threaded end 78. An annular groove 71 is formed in the piston 70 for receiving an O-ring 73 for sealing the piston to the interior of the cylindrical sidewall 53 while permitting reciprocating, axial sliding movement of the body 52 relative to the piston 70. Likewise, an annular groove 75 is formed in the central aperture in the piston 70 for receiving an O-ring 77 for sealing the piston rod 76 to the piston 70. There is thus defined a sealed lower chamber 80 between the lower surface of the piston 70 and the bottom enclosure 54, and a sealed upper chamber 82 between the upper surface of the piston 70 and the top enclosure 56 of the cylinder body 52. The piston rod 76 further includes a central aperture or bore 79 extending throughout its length for venting the lower chamber 80. For this purpose, the piston rod 76 includes an interiorally threaded hole 81 at its upper end within which is received a porous plug 84 (shown in FIG. 2 only). The top enclosure 56 furthermore includes an annular groove 91 for receiving an O-ring 92 for sealing the piston rod 76 thereto. Hydraulic fluid for operating the assemblage of piston 70 and body 52 is introduced from a hydraulic line 93 connected at a remote end to a suitable source of hydraulic fluid (not shown) and through a quick disconnect coupling 94, inlet fitting 96 and an inlet passageway 90 to the upper chamber 82.

Affixed to the body 52 is a pair of radially extending support frames 100 and 102 which are identical in construction and respectively carry retractable support lugs 101 and 103. Since these structures are identical, detailed reference will be had only to the frame 102 and lug 103, best seen in FIG. 3. The frame 102 defines therein a channel 104 of generally rectangular cross-section for receiving therewithin the mating rectangular portion of the lug 103. Hole 106 formed in the lug 103 is disposed to be in alignment with slot 108 in the upper wall 104b; the lower wall 104a of the channel 104 furthermore includes a pair of inward and outward, i.e., radially displaced, holes 110 and 112 (FIG. 2), with which the hole 106 of the lug 103 may be selectively aligned. In either aligned position, a locking pin support ring 114 having a threaded shank 115 is inserted through the slot 108, the hole 106, and the selected one of the holes 110 and 112, and thereafter a locking pin 116 is threaded onto the shank 115. In use, the locking pin support ring 114 simply is raised, withdrawing the locking pin 116 into the aligned hole 106 of the lug 103 and thus permitting the lug 103 to be moved from its extended position illustrated in FIG. 2 to a retracted position in which the locking pin support ring 114 is aligned with the radially inward hole 110; the pin 116 then is lowered into hole 110 to lock the lug 103 in its retracted position.

With reference to the structure as shown in assembled fashion in FIG. 2, the aforedescribed elements of the tool 50 of the invention are inserted into the top of the ice basket 10, with the lugs 101 and 103 locked in the retracted position. When necessary, any ice within the top portion of the basket is removed to accommodate positioning the tool 50 therewithin; due to the small height of the tool 50, it can be appreciated that only a minimal amount of ice would have to be removed to accommodate same. Once the tool 50 is positioned within the upper portion of the ice basket 10, generally in the position indicated, the lugs 101 and 103 are moved to the extended position with the outer ends thereof projecting through associated, aligned openings 12 in the sidewall 11 of the ice basket 10, as shown. While different configurations of course are possible, it has been found convenient to configure the outer ends or extremities of the lugs 101 and 103, as seen for lug 103, to include bifurcated end projections 103a and 103b which are received in correspondings ones of an adjacent pair of the openings 12 in the sidewall 11 of the ice basket 10. Moreover, as seen from FIG. 2, the lugs 101 and 103 include lips 101c and 103c adjacent the outer ends thereof for engaging the lower edge of the support ring 32, as seen in FIG. 2.

A support bar 120 then is positioned on the upper ends of the lattice frame 23, so as to span the corresponding compartment therein containing the illustrated ice basket 10, with the upper threaded end 78 of the piston rod 76 inserted through the accommodating, central hole 121 in the support bar 120. A load cell, or transducer, 122 is received over the upper end of the piston rod 76 and a support ring 124 then is threaded onto the upper, threaded end of the piston rod 76 for securing the structure together. The ring 124 is tightened by hand, raising the tool 50 so that the lugs 101 and 103 are engaging the support ring 32 and the piston 70 is in contact with the top enclosure 56.

It will be appreciated that in those ice basket installations which do not have a confining overhead structure, as illustrated by the frame 26 in FIG. 2, that the tool 50 simply can be maintained in assembled condition and moved to successive ice baskets 10, simply by movement of lugs 101 and 103 between retracted and extended positions, without requiring the assembly steps just described.

In use, it will be appreciated that it is necessary to remove any ice situated within the upper reaches of the ice basket 10, typically to a depth of 8" to 10", so as to permit insertion of the tool 50 into the upper, open end of the ice basket 10 for positioning same therewithin in the manner indicated in FIG. 2. Thereafter, hydraulic fluid under controlled, increasing pressure is applied through the line 90 into the upper chamber 82. A hydraulic hand pump (not shown) may be used for this purpose. Since the piston 70 remains stationary due to the rigid connection of the piston rod 76 and the support bar 120, the cylinder body 52 is driven upwardly by the hydraulic force of the applied fluid. From FIG. 1, it will be appreciated that the height to which the ice basket 10 is raised is restricted by the length of the slots 19 in the support brackets 18. Since the top of the slot 19 normally is in contact with the pin 20, any upward movement of the ice basket 10 will be readily detected, and will provide a sufficient indication that the ice basket 10 has been lifted.

The area on which the pressure acts, for a given level of applied pressure, permits easy computation of the total basket weight. Moreover, the load cell 122, through an appropriate meter, may indicate the weight directly. Since the actual weight of the empty ice basket is known in advance, the weight of the ice in the ice basket may readily be calculated from the total basket weight, as measured.

Once the weight determination has been made, the hand pump or other source of supplied hydraulic fluid may be vented, as with a conventional hydraulic jack, and the ice basket 10 will settle slowly to its rest postiion as shown in FIG. 1. By venting the lower chamber 80 through the axial hole 79 in the piston 76, an operator will be able to tell immediately if any leakage of the hydraulic fluid into the lower chamber 80 has occurred.

In accordance with the foregoing, it will be appreciated that, in accordance with the invention, a simple, yet rugged and compact structure has been afforded as an ice basket weighing tool permitting efficient and effective weighing of ice baskets, for determining the weight of the ice contained therein. It will be appreciated to those of skill in the art that numerous modifications and adaptations of the compact ice basket weighing tool of the invention may be made, and thus it is intended by the appended claims to cover all such modifications and adaptations which fall within the true spirit and scope of the invention.

I claim as my invention:

1. A weighing tool for vertically lifting an element having upper and lower ends from the upper end thereof, said element being mounted at the lower end thereof so as to permit said element to be raised vertically upwardly from a rest position within a corresponding compartment of a support which laterally confines said element, comprising:
   a support bar adapted to be received on said support for spanning said compartment in a position vertically displaced above said upper end of said element positioned therein;

a housing;

a piston received in sealed, sliding relationship within said housing and defining upper and lower chambers therein;

a piston rod secured at its lower end to said piston and selectively connected at its upper end to said support bar;

means for selectively connecting said housing to said upper end of said element with said housing disposed centrally of said element;

means for introducing hydraulic fluid under pressure into said upper chamber for driving said housing upwardly relatively to said piston and raising said element therewith; and means responsive to the upward vertical raising of said element by said tool for providing an indication of the weight of said element.

2. A weighing tool as recited in claim 1, wherein said means for determining the weight of said element when vertically raised from the rest position comprises:

means for determining the pressure of the hydraulic fluid introduced into said upper chamber, necessary for vertically raising said element from said rest position, to provide an indication of the weight of said element.

3. A weighing tool as recited in claim 1, wherein said means for determining the weight of said element when vertically raised from the rest position comprises:

a transducer received on said support bar and engaged by said upper end of said piston rod so as to be subjected to the weight of said element, when vertically raised from said rest position thereof, thereby to provide an indication of the weight of said element.

4. A tool for weighing a selected one of a plurality of generally elongated ice baskets disposed in generally vertical, closely spaced relationship within respectively corresponding, laterally confining compartments of a lattice support frame, each said ice basket having a generally cylindrical sidewall with an array of closely spaced apertures therein, a closed, lower end and an open, upper end, and each said ice basket being mounted at the lower end thereof so as to permit said ice basket to be lifted vertically upwardly from a rest position within the respectively corresponding, laterally confining compartment of said lattice support frame, comprising:

a support bar adapted to be received on said support frame for spanning an individual said compartment in a position vertically displaced above said upper end of said corresponding ice basket positioned therein;

a body;

a piston received in sealed, sliding relationship within said body and defining upper and lower chambers therein;

a piston rod secured at its lower end to said piston and selectively connected at its upper end of said support bar;

at least first and second lug support frames secured to said body and extending generally laterally outwardly therefrom, each said lug support frame defining a corresponding, laterally extending channel therewithin;

at least first and second support lugs received in sliding relationship with said respective channels of corresponding ones of said lug support frames and adapted for selective lateral movement between retracted and extended positions, said support lugs being movable to said retracted positions to facilitate positioning of said tool within the upper end of said ice basket, and being moveable to said extended positions for being received through corresponding said apertures in the cylindrical sidewall of the ice basket for selectively connecting said body to said ice basket; and means for introducing hydraulic fluid under pressure into said upper chamber for driving said body upwardly relative to said piston and lifting said element therewith.

5. A tool as recited in claim 4, further comprising:

means responsive to said ice basket, when lifted from said rest position, to provide an indication of the weight thereof.

6. A tool as recited in claim 5, wherein said responsive means comprises means for determining the pressure of the hydraulic fluid introduced into said upper chamber, necessary for vertically raising said ice basket from said rest position, thereby to provide an indication of the weight of said ice basket.

7. A tool as recited in claim 4, further comprising a transducer received on said support bar and engaged by said upper end of said piston rod so as to be subjected to the weight of said ice basket, when vertically raised from said rest position thereof by said tool, thereby to provide an indication of the weight of said element.

8. A tool as recited in claim 4, wherein:

each said lug support frame comprises at least upper and lower surfaces defining said channel therein, a slot extending in a common lateral direction with said channel through said upper surface of said support frame, and first and second holes in said lower surface of said lug support frame in alignment with said slot and disposed respectively in laterally displaced positions corresponding to inner and outer ends of said slot;

said support lug further includes a hole therein disposed to be in alignment with said slot and, selectively, with said first and second holes in said lower surface of said lug support frame in said respective retracted and extended positions of said lug; and there is further provided:

locking means selectively moveable between raised and lowered positions, and in said raised position thereof being received only through said slot and said hole in said lug to permit sliding movement of said lug within said channel, and in said lowered position thereof being further selectively received in said first and second holes in said lower surface of said lug support frame for locking said support lug respectively in said retracted and extended positions of said lug.

9. A tool as recited in claim 4, wherein:

said piston defines a central, vertical axial bore therethrough communicating with said lower chamber.

10. A tool as recited in claim 9, wherein there is further provided a porous plug disposed on the upper end of said piston rod for blocking said central axial bore therein.

11. A method for determining the weight of an ice basket of generally cylindrical configuration and having a generally cylindrical sidewall with apertures therein, an open, upper end, and a closed, lower end, said ice basket being mounted at said lower end thereof so as to permit said ice basket to be raised vertically upwardly from a rest position within a corresponding, laterally confining compartment of a lattice support frame, comprising the steps of:

disposing a weighing tool within the open, upper end of said ice basket, said weighing tool comprising a central body, a piston received in sealed, sliding relationship within said body and defining upper and lower sealed chambers therein, a piston rod secured at its lower end to said piston and having an upper, free end, lug support frames secured to said body and extending generally laterally outwardly therefrom, and support lugs mounted in sliding relationship on corresponding ones of said lug support frames and adapted for lateral movement between retracted and extended positions relative thereto, said support lugs being configured at the outer extremities thereof to be received in corresponding apertures of said cylindrical sidewall of said ice basket, said disposing step including moving said support lugs to said retracted positions for inserting said weighing tool within the upper end of said ice basket and then moving said support lugs to said extended positions thereof for inserting said end extremities thereof through corresponding said apertures in said cylindrical sidewall of said ice basket;

positioning a support bar on said lattice support frame for spanning said corresponding compartment;

securing the upper, free end of said piston rod to said support bar, thereby raising said piston rod relative to said support bar and accordingly said piston and said body, to cause said lugs to tightly engage the upper boundaries of said apertures of said ice basket;

introducing hydraulic fluid under controlled, selectively increasing pressure into said upper chamber of said body for driving said body upwardly relatively to said piston and raising said ice basket, as supported on said lugs and through said lug support frames by said body, from said rest position; and deriving a value representative of the weight of said ice basket when vertically raised from said rest position.

12. A method as recited in claim 11, further comprising:

affixing a load cell between said upper end of said piston rod and said support bar, before securing said upper end of said piston rod to said support bar, so as to subject said load cell to the weight of said ice basket when raised from said rest position; and said value deriving step comprises deriving an output from said load cell representative of the weight of said ice basket when raised from said rest position.

13. A method as recited in claim 11, wherein said deriving step comprises, measuring the pressure level of the hydraulic fluid introduced into said upper chamber which is necessary for vertically raising said ice basket from said rest position, and determining the weight of said ice basket in accordance with the aforesaid pressure, as measured, and the surface area of the piston on which said fluid acts.

* * * * *